(12) United States Patent
Tappan (10) Patent No.: US 11,790,755 B2
(45) Date of Patent: Oct. 17, 2023

(54) EVENT VISUALIZATION FOR ASSET CONDITION MONITORING

(71) Applicant: Baker Hughes Holdings LLC, Houston, TX (US)

(72) Inventor: Jacqueline Tappan, Minden, NV (US)

(73) Assignee: Baker Hughes Holdings LLC, Houston, TX (US)

( * ) Notice: Subject to any disclaimer, the term of this patent is extended or adjusted under 35 U.S.C. 154(b) by 56 days.

(21) Appl. No.: 17/512,144

(22) Filed: Oct. 27, 2021

(65) Prior Publication Data

US 2023/0129813 A1    Apr. 27, 2023

(51) Int. Cl.
*G08B 21/18* (2006.01)
*G06F 3/0482* (2013.01)

(52) U.S. Cl.
CPC ......... *G08B 21/187* (2013.01); *G06F 3/0482* (2013.01); *G08B 21/182* (2013.01)

(58) Field of Classification Search
CPC .... G08B 21/187; G08B 21/182; G06F 3/0482
USPC ......................................................... 340/679
See application file for complete search history.

(56) References Cited

U.S. PATENT DOCUMENTS

| | | | | |
|---|---|---|---|---|
| 5,365,787 A * | 11/1994 | Hernandez | ............... | G01H 1/10 |
| | | | | 73/660 |
| 9,013,322 B2 * | 4/2015 | Roberson | ............... | G01V 3/00 |
| | | | | 175/2 |
| 10,347,113 B1 * | 7/2019 | Cho | ............... | G08B 25/08 |
| 10,726,711 B2 * | 7/2020 | Subramanian | ............ | G08B 31/00 |
| 11,272,011 B1 * | 3/2022 | Laughton | ............... | G05B 15/02 |
| 2002/0077711 A1 * | 6/2002 | Nixon | ............... | C10G 11/187 |
| | | | | 700/51 |
| 2002/0113877 A1 * | 8/2002 | Welch | ............... | B66B 27/00 |
| | | | | 348/148 |
| 2003/0014500 A1 * | 1/2003 | Schleiss | ............... | G06Q 10/06 |
| | | | | 709/218 |
| 2004/0249694 A1 * | 12/2004 | Luo | ............... | G06Q 10/10 |
| | | | | 705/7.26 |
| 2005/0007249 A1 * | 1/2005 | Eryurek | ............... | G05B 23/027 |
| | | | | 340/511 |
| 2009/0107921 A1 * | 4/2009 | Chen | ............... | C02F 5/08 |
| | | | | 210/90 |

(Continued)

*Primary Examiner* — Zhen Y Wu
(74) *Attorney, Agent, or Firm* — MINTZ LEVIN COHN FERRIS GLOVSKY AND POPEO, PC (57) ABSTRACT

In one aspect, a method includes receiving data characterizing an alarm event report associated with a first industrial machine generated by a first user via a first web-based graphical user interface (GUI). The first web-based GUI associated with an enterprise monitoring system of an industrial enterprise that includes the first industrial machine. The alarm event report includes at least a portion of an event dataset including information of an alarm event associated with the first industrial machine, and an identity of a second user assigned to work on the alarm event report by the first user. The method further includes providing the alarm event report to a second web-based graphical user interface (GUI) associated with the enterprise monitoring system. The method also includes receiving, via a first GUI of a first monitoring system, data characterizing additional information associated with the alarm event and/or edits to the event dataset.

19 Claims, 6 Drawing Sheets

(56) References Cited

U.S. PATENT DOCUMENTS

| | | | | |
|---|---|---|---|---|
| 2010/0214090 | A1* | 8/2010 | Sartini | H04L 67/125 |
| | | | | 340/517 |
| 2010/0268762 | A1* | 10/2010 | Pahlavan | G06F 3/0485 |
| | | | | 709/203 |
| 2017/0011359 | A1* | 1/2017 | Endo | G06Q 10/10 |
| 2017/0336930 | A1* | 11/2017 | Tappan | G08B 21/18 |
| 2017/0357952 | A1* | 12/2017 | Scott | G06Q 10/1097 |
| 2018/0173217 | A1* | 6/2018 | Spiro | G05B 23/0235 |
| 2018/0181923 | A1* | 6/2018 | Yokochi | G06Q 10/0875 |
| 2018/0285831 | A1* | 10/2018 | Meruva | G06Q 10/1097 |
| 2018/0315301 | A1* | 11/2018 | Subramanian | G06F 3/0481 |
| 2019/0131670 | A1* | 5/2019 | Martinez | G01F 23/292 |
| 2020/0126381 | A1* | 4/2020 | Yudichak | G08B 13/19691 |
| 2020/0209430 | A1* | 7/2020 | Shukla | H02J 3/38 |
| 2020/0210854 | A1* | 7/2020 | Srinivasan | G06N 20/00 |
| 2021/0209926 | A1* | 7/2021 | Holub | G08B 21/182 |

* cited by examiner

Sub-Synchronous Rub Detected 600

| LOCATION | CONDITION |
|---|---|
| Recycle Compressor > Motor > Shaft ⌄ ⊕ | Shaft Rub ⌄ |

DETAILS

Priority: Unsatisfactory ⌄
604

Flag for Next
Review: After Set Time ⌄ 30 Days ⌄
606

COMMENTS

InsightPak alarm on Recycle Compressor, BN CONFIRMED: 1/2 component due to re-excitation of natural frequency.
602
608

CANCEL  SAVE

FIG. 6

EVENT VISUALIZATION FOR ASSET CONDITION MONITORING

BACKGROUND

Many process-intensive industries, such as hydrocarbon refining and power generation, can rely heavily upon operation of machinery, and in some instances, continuous operation of machinery. In these environments, failure of one or more machines can incur significant costs due to repair expenses as well as loss of production and potential injury to workers. Given these risks, it can be common to monitor certain operating parameters of one or more machine components. Measurements of the operating parameters can provide an indication of the mechanical condition of a machine component, allowing preventative maintenance (e.g., repair, replacement, etc.) to be performed on the machine component prior to failure. This condition monitoring can provide one or more long term benefits, such as lower production costs, reduced equipment down time, improved reliability, and enhanced safety.

SUMMARY

In some aspect, a method includes receiving data characterizing an alarm event report associated with a first industrial machine generated by a first user via a first web-based graphical user interface (GUI). The first web-based GUI associated with an enterprise monitoring system of an industrial enterprise that includes the first industrial machine. The alarm event report includes at least a portion of an event dataset including information of an alarm event associated with the first industrial machine, and an identity of a second user assigned to work on the alarm event report by the first user. The event dataset is stored in a database associated with the enterprise monitoring system. The method further includes providing the alarm event report to a second web-based graphical user interface (GUI) associated with the enterprise monitoring system. The method also includes receiving, via a first GUI of a first monitoring system, data characterizing additional information associated with the alarm event and/or edits to the event dataset. The method further includes storing data characterizing additional information associated with the alarm event in the event dataset in the database and/or editing the event dataset in the database.

One or more of the following features can be included in any feasible combination.

In some implementations, the method further includes receiving data charactering selection of the at least portion of the event dataset to be included in the alarm event report based on interaction of the first user with the one or more of the plurality of interactive graphical objects in a dialog box in the first web-based GUI; and generating the alarm event report including the selected portion of the information of the alarm event. In some implementations, information of the alarm event associated with the first industrial machine includes one or more of location of the first industrial machine. An alarm level is associated with the alarm event and operating parameters of the first industrial machine.

In some implementations, the method further includes receiving, via the second web-based GUI, data characterizing a request to switch from the second web-based GUI to the first GUI of the first monitoring system; and providing the first monitoring system access to the at least a portion of the event dataset via the first GUI of the first monitoring system. In some implementations, the first monitoring system is configured to monitor the operations of the first industrial machine. The monitoring includes receiving operating characteristic from sensors operatively coupled to the first industrial machine, and generating an alarm event.

In some implementations, the method further includes generating the first web-based GUI including a first portion and a second portion. The first portion includes a list of a plurality of industrial machines in the industrial enterprise. The method also includes receiving data characterizing selection of the first industrial machine from the list of the plurality of industrial machines; and displaying in the second portion of the web-based GUI, information associated with the alarm event of the first industrial machine. In some implementations, the second portion of the web-based GUI, includes a plot of an operating parameter of the first industrial machine as a function of time of detection of the operating parameter.

In some implementations, the alarm event report further includes an access level associated with the second user. The access level determines a type of edit to the information associated with alarm event and/or access to information associated with the first industrial machine stored in the database. In some implementations, data characterizing additional information associated with the alarm event includes analysis of the alarm event generated via the first GUI of the first monitoring system.

In some implementations, the method further includes generating, via the first GUI of the first monitoring system, a revised alarm event report associated with the first industrial machine. The revised alarm event report is based at least on the additional information. The revised alarm event report at least includes the additional information received via the first GUI and an identity of a third user assigned to work on the alarm event report by the second user. The method also includes providing the revised alarm event report to a second monitoring system of a second industrial site. The industrial enterprise includes the second industrial site. The method further includes receiving, via a second GUI of the second monitoring system, data characterizing second additional information associated with the alarm event; and storing data characterizing the second additional information associated with the alarm event in the database.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Industrial machines can be monitored by monitoring systems to ensure operation within acceptable tolerances. In general, machine monitoring can include measuring operating parameters of one or more of the machine components by sensors, determining whether the machine components are operating properly from the operating parameter measurements, and issuing warnings if a machine component is determined to be operating improperly. These warnings can allow corrective action to be taken in advance of machine failure, providing benefits such as lower production costs, reduced equipment down time, improved reliability, and/or improved safety.

An industrial enterprise can include multiple industrial sites that can be geographically separated (e.g., across the globe). An industrial site can include multiple industrial machines. The industrial site can include a monitoring system configured to monitor the industrial machines at the industrial site. In the existing paradigm, a user of a first monitoring system may not be aware of alarm events at a second monitoring system. Even if the user is aware, he/she may not have access to the second monitoring system (e.g., operational data detected by the second monitoring system, steps undertaken at the second monitoring to resolve the alarm event, etc.). As a result, establishing collaboration between users of different monitoring systems may be challenging. For example, the expertise of a recycle compressor expert at a first industrial site may not be leveraged to handle a failure/alarm event associated with a recycle compressor at a different industrial site.

In some implementations, the current subject matter provides for an ecosystem that allows seamless collaboration between users across different industrial sites of an industrial enterprise. This can result in an improved (e.g., optimized) asset management. For example, an enterprise monitoring system is provided that supports web-based graphical user interfaces (GUI) through which a user can monitor and manage an industrial machine located anywhere in the industrial site. The first user may seamlessly hand over the management of an alarm event of an industrial machine to a second user. The first user may also control the access level of the second user (e.g., operations that the second user can perform, alarm event data that the second user can have access to, etc.). In some implementations, the work done by first user on the alarm event can be curated and provided to the second user. This can improve the efficiency of collaboration as the first user may not have to use a different communication means (e.g., an email service) to communicate to the second user the details of the alarm event, work done on the alarm event, etc.

Figure 1:
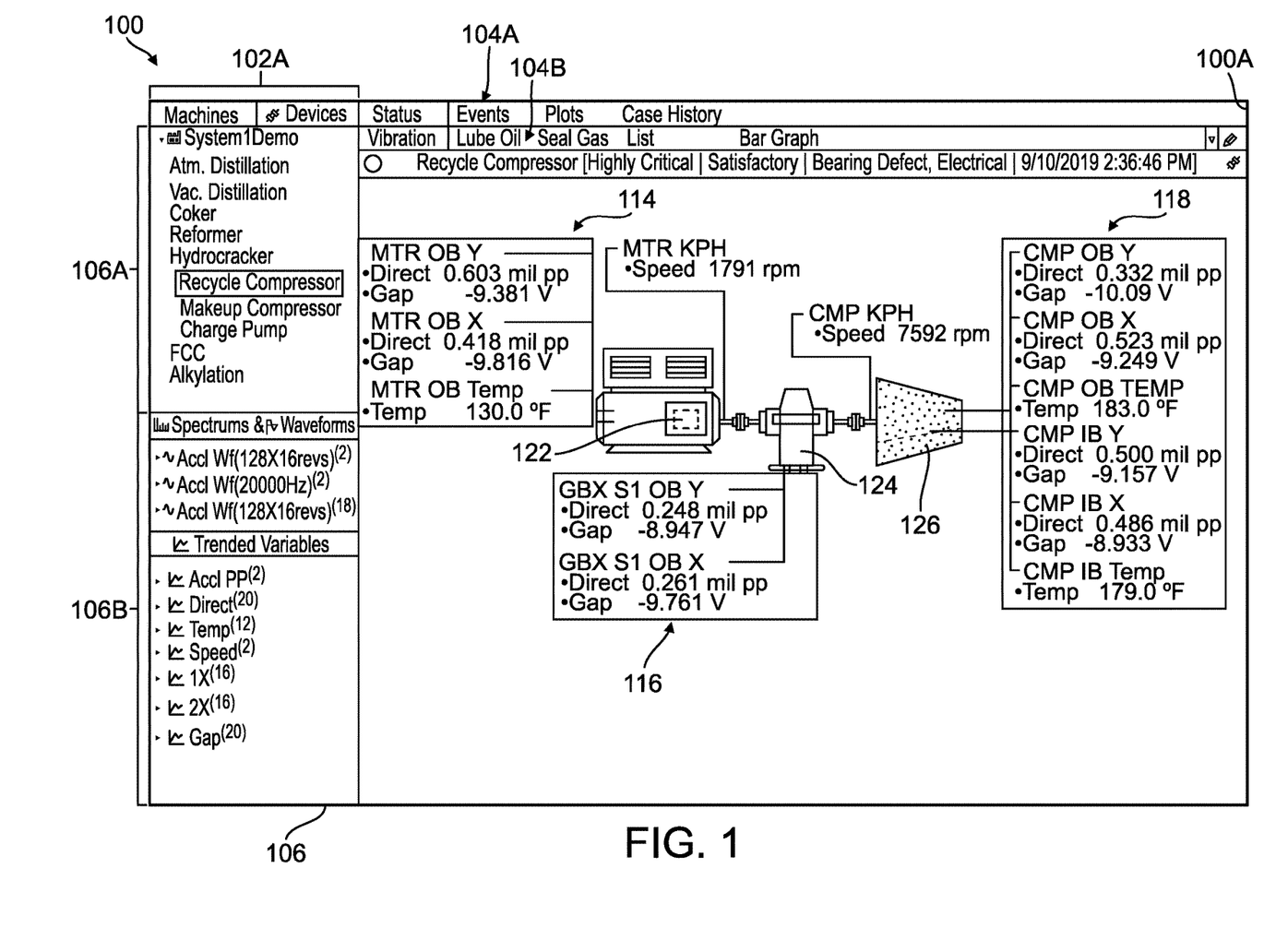
FIG. 1 is a schematic representation of an exemplary embodiment of a GUI of a monitoring system associated with an industrial site that includes multiple industrial machines.

FIG. 1 is a schematic representation of an exemplary embodiment of a GUI 100 of a condition monitoring system associated with industrial machines at an industrial site. The GUI 100 includes a first portion 100A and a second portion 100B. The first GUI portion 100A includes user selectable options, while the second GUI portion 100B is updated to display visual representation of the industrial machine corresponding to option selected within the first GUI portion 100A. As shown, the first GUI portion 100A includes a selection option 102, primary display options 104A, secondary display options 104B, and a plurality of view spaces 106 having content that can dynamically change in response to the industrial machine selected via the selection option 102. As shown, the selection option 102 can include industrial machines and condition monitoring devices (e.g., physical monitors) at the industrial site.

The primary display options 104A can include status, events, plots, and case history associated with the industrial machine or device selected from the selection option 102. Status can include a condition of the selected industrial machine based upon one or more measurements acquired by the sensors or received by a third party system (e.g., Satisfactory, Unsatisfactory, Warning, Alarm, etc.) Events can be alarm or system logs that alert the user to potential component health issues (e.g., a measured parameter or exceeding a threshold value). Plots can include any graphical representation of measured data. The case history can include plots of historical data and historical reports. The secondary display options 104B can include sub-types of displays views based upon the selection option 102 and primary display option 104A. Examples of display sub-types can include a type of defined charting view (e.g. vibration, surge curve) and/or a type of display (e.g., list, bar graph, etc.).

The dynamic view space 106 can include information associated with the industrial machine selected via the selection option 102. The information can include hierarchical information displayed in a hierarchical view space 106A of the dynamic view space 106. The hierarchical information can include a first level associated with the site of the industrial machine, a second level associated with the process system associated with the industrial machine, a third level indicative of the type of machine, etc. The information can include operating parameters derived from measurements acquired from sensors (e.g., acceleration, temperature, speed, displacement, gap distance, etc.) associated with the selected machine. The operating parameter can be displayed in measurement view space 106B of the dynamic view space 106. Under circumstances where operating parameters are displayed in the second GUI portion 100B (e.g., a plot), the displayed operating parameter can be selected from the measurement view space 106B.

The GUI 100 of FIG. 1 illustrates a visual representation in the second GUI portion 100B corresponding to selection of a machine (e.g., a recycle compressor) from the plurality of machines in the component options 102, a view selected from the primary display options 104A, and a view list selected from the secondary display options 104B. The visual representation of the selected machine can include visualizations of the components of the selected machine. For example the visual representation of a recycle compressor can include a first visualization 122 of a motor of the recycle compressor, a second visualization 124 of a gearbox of the recycle compressor and a third visualization 126 of the compressor of the recycle compressor. The second GUI portion 100B can include an identifier (e.g., name) associated with the various components of the selected industrial machine and one or more data fields. For example, the second GUI portion 100B can include graphical objects 114 that display data entries 116 associated with a respective machine component. The data entries 116 can include operational parameters such as real-time measurement data (e.g., operating state of the machine, status indication, speed, etc.) received from various sensors 18 disposed on a respective machine component 112, outputs of analyses performed by the processor based upon measurement data received from various sensors disposed on a respective machine component, or the like. GUI 100 further updates the measurement view space 106B to display operational parameters (e.g., acceleration, temperature, speed, displacement, gap distance, etc.) associated with a selected machine component.

Figure 2:
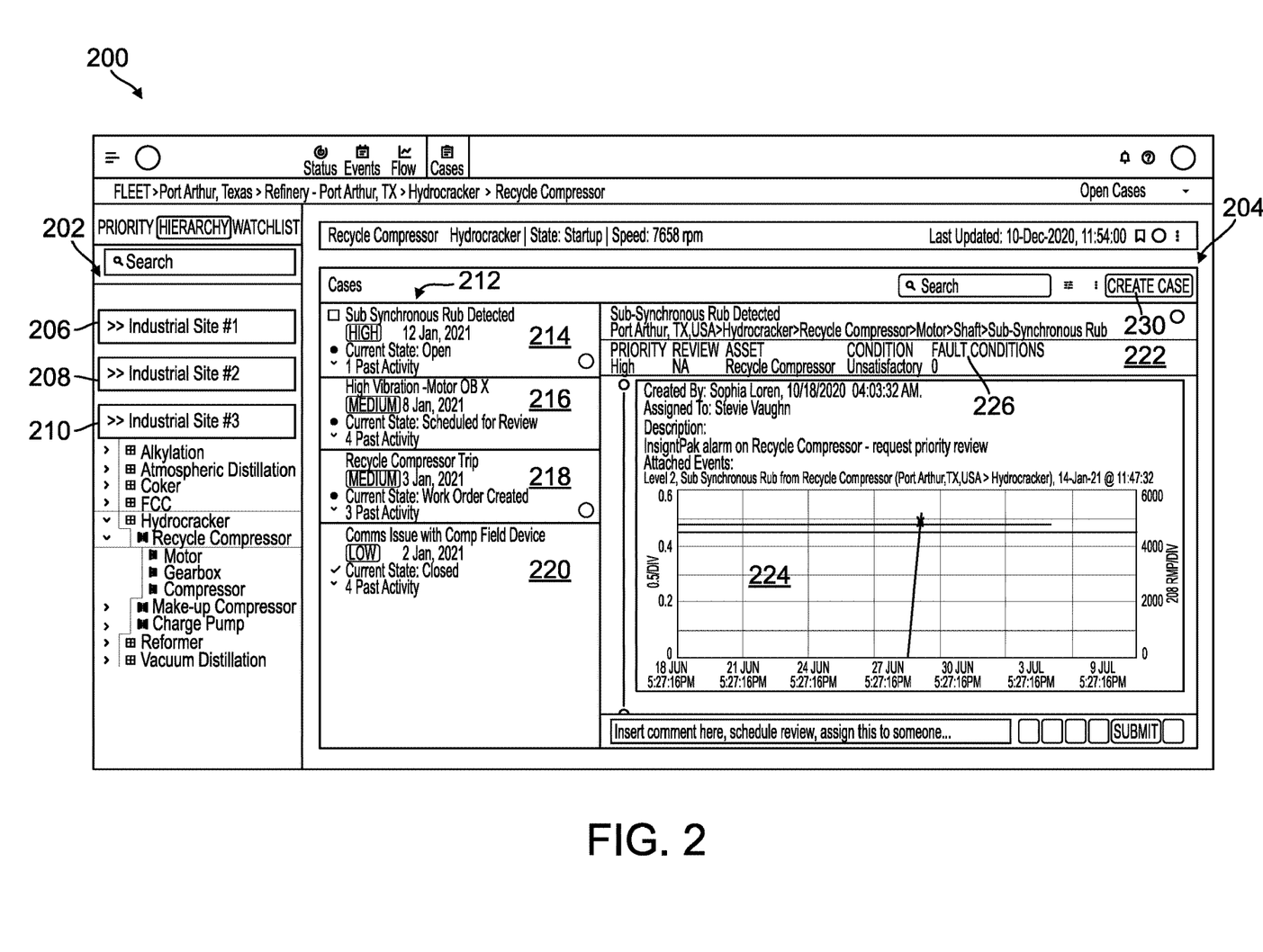
FIG. 2 illustrates an exemplary web-based graphical user interface (GUI)

FIG. 2 illustrates an exemplary web-based GUI 200. The web-based GUI includes a first portion 202 and a second portion 204. The first portion 202 includes multiple interactive graphical objects 206-210. Each of the graphical objects 206-210 can represent an industrial site. For example, graphical object 206 represents a first industrial site, graphical object 208 represents a second industrial site, and graphical object 210 represents a third industrial site. An industrial machine at an industrial site can be selected from a drop-down menu that is presented in the first portion 202 upon interaction with the graphical object indicative of the industrial site. Upon selection of an industrial machine in the first portion 202, an alarm list 212 (including a list of events/alarms associated with the selected industrial machine) is displayed in the second portion 204 of the web-based GUI 200. An alarm event (e.g., one of the alarm events 214-320) can be selected from the alarm list 212, and information associated with the selected alarm event can be displayed in the alarm window 222 in the second portion 204 of the web-based GUI 200.

As an example, clicking on the third graphical object 210 can generate a drop-down menu from which the recycle compressor (included in the hydrocracker at the third industrial site) can be selected and a list of alarms associated with the recycle compressor can be displayed in the alarm list 212. From the alarm list 212, a first alarm event 214 (associated with detection of sub synchronous rub in the recycle compressor) can be selected, and information associated with the sub synchronous rub detection can be displayed in the alarm window 222.

The alarm information can include operating parameters/operating states of the industrial machine that has been detected (or determined) as a function of time, alarm activity (e.g., active, cleared, etc.), alarm acknowledgement (e.g. whether the alarm event has been acknowledged or not), whether the alarm has been suppressed or shelved, etc. In some implementations, alarm information can include a plot 224 of the operating parameters/operating state as a function of time that can be displayed in the alarm window 222. The alarm information can include case management status of the alarm event that can include case activity (e.g., new, open, closed), assignment status (e.g., who the alarm event has been assigned to), associated alarm events, notes/annotations associated with the alarm, etc.

A user interacting with the web-based GUI 200 may review the alarm event and the associated alarm information and decide to assign the review of the alarm event to a second user. The web-based GUI 200 can allow the user to communicate with the second user and provide the second user with the desirable information that is needed to perform the review. This can be done, for example, by generating an alarm event report. The web-based GUI 200 includes an interactive graphical object 230 that can be used to generate the alarm event report. In some implementations, the user can select a subset of the alarm information (e.g., alarm information available in the alarm window 222) to be included in the alarm report. The details of the generation of alarm report are described below.

Figure 3:
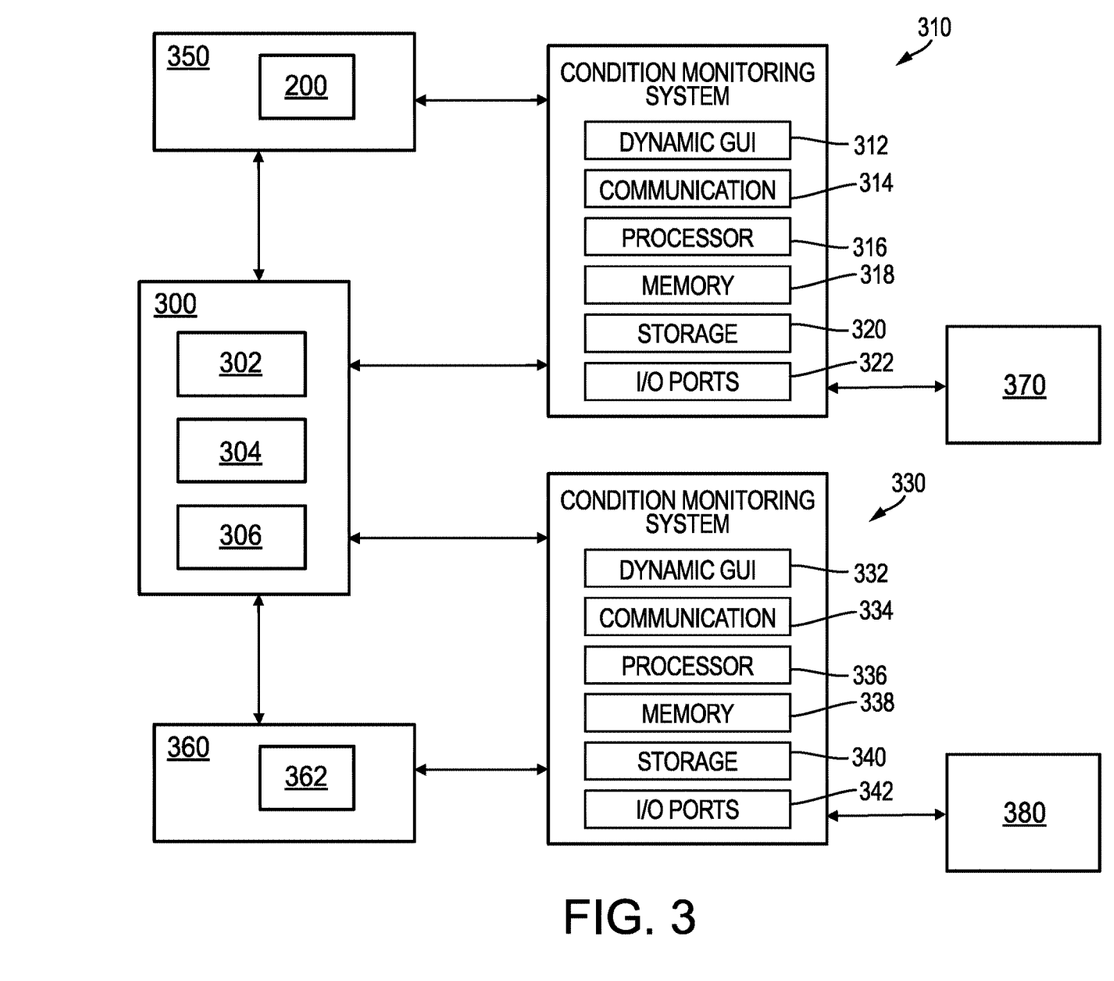
FIG. 3 illustrates an exemplary enterprise monitoring system of an industrial enterprise.

An enterprise monitoring system can monitor the operations of industrial machines across the industrial enterprise. For example, the enterprise monitoring system can be communicatively coupled with monitoring systems across the industrial enterprise and receive alarm event information of the industrial machines from their respective monitoring system, and present the alarm event information via a web-based GUI (e.g., web-based GUI 200). FIG. 3 illustrates an exemplary enterprise monitoring system 300 of the industrial enterprise. The enterprise monitoring system 300 can include a processor 302, a memory 304 and a data storage 306. The enterprise monitoring system 300 can generate multiple web-based GUIs. The enterprise monitoring system 300 can communicate with multiple monitoring systems associated with different industrial sites. For example, a first monitoring system 310 and a second monitoring system 330 can be configured to monitor the industrial machine 370 and industrial machine 380, respectively. The monitoring systems 310 and 330 can be communicatively coupled to the enterprise monitoring system 300.

Each web-based GUI can be presented to a user of monitoring system. In some implementations, the web-based GUI can be presented to a user via a display device of a computing system communicatively coupled to the enterprise monitoring system 300 via the World Wide Web. For example, a first web-based GUI (e.g., web-based GUI 200) can be presented to a first user via a first user computing device 350 and a second web-based GUI (e.g., web-based GUI 200) can be presented to a second user via a second user computing device 360. An exemplary first/second web-based GUI is described in FIG. 2 above.

The first user computing device 350 (second user computing device 360) can be communicatively coupled to the first monitoring system 310 (second monitoring system 330) (e.g., via the world-wide web). In some implementations, the user computing devices (e.g., first computing device 350, second computing device 360, etc.) can be included in the monitoring system (e.g., first monitoring system 310, second monitoring system 330, etc.).

The first monitoring system 310 can include components configured to display data, process data, and analyze data. As shown, the first monitoring system 310 (second monitoring system 330) includes a communication component 314 (communication component 334), a processor 316 (processor 336), a memory 318 (memory 338), a data storage 320 (data storage 340), input/output (I/O) port 322 (input/output (I/O) ports 342), and the like. The communication component can be a wireless or wired communication component that facilitates communication between the respective monitoring system and the enterprise monitoring system 300, sensors coupled to the industrial machine (e.g., first industrial machine 370, second industrial machine 380, etc.) monitored by the respective monitoring system (e.g., first monitoring system 310, second monitoring system 330, etc.) and the like. The processor can be any type of computer processor or microprocessor capable of executing computer-executable code. The memory and the data storage can be any suitable articles of manufacture that can serve as media to store processor-executable code, data, or the like. The processor can be configured to generate graphical user interface (GUI) configured for display upon a display device of the monitoring system or on the user computing device. The GUI 312 (or GUI 332) can include visualizations that represent the industrial machines/sensors in the industrial site being monitored by the condition monitoring system 310. As such, users of the monitoring system 310 (monitoring system 330) may monitor the health or status of first industrial machine 370 (second industrial machine 380) via the GUI 312 (GUI 332). GUI 100 is an example of GUI 312 or GUI 332.

Figure 4:
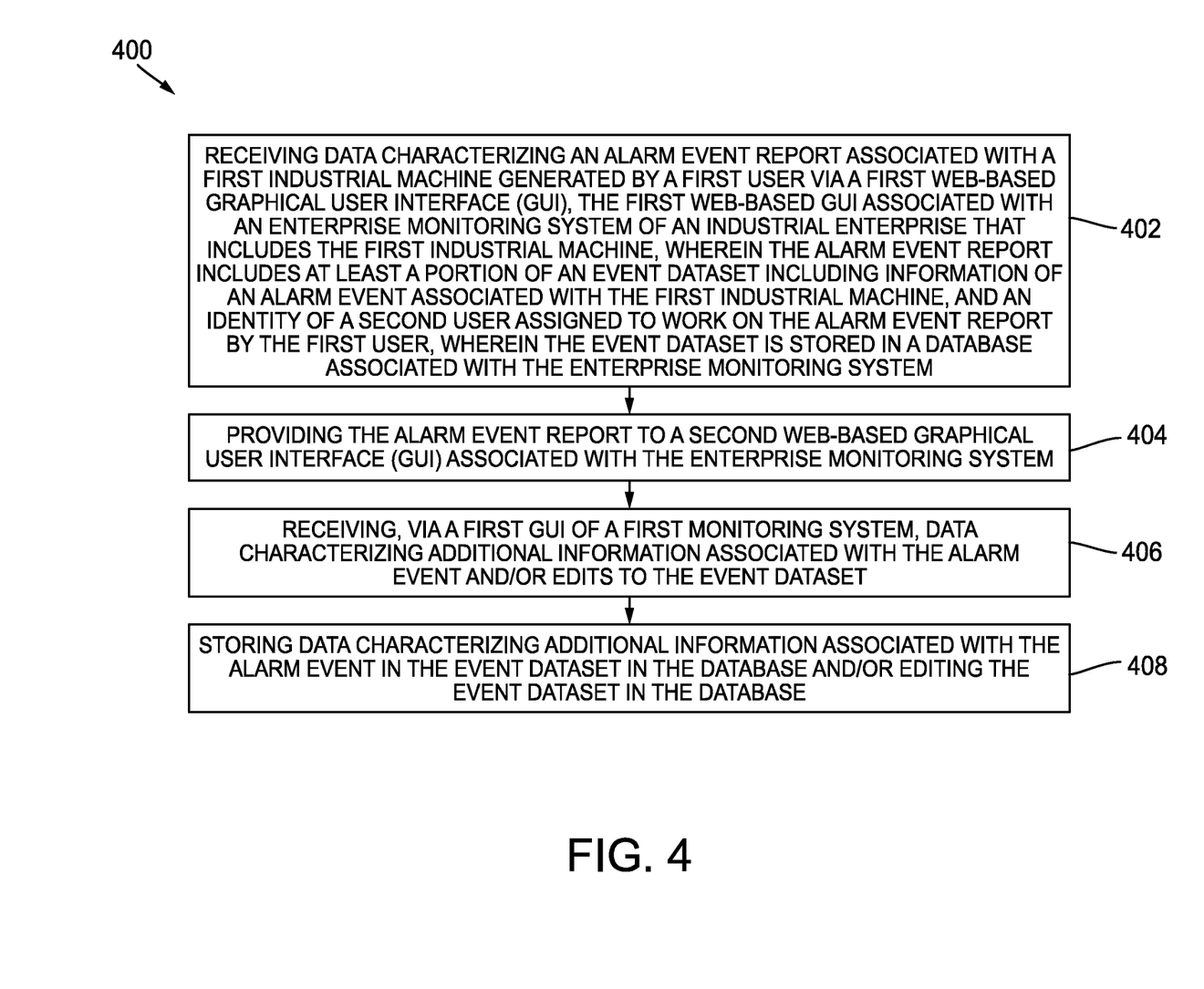
FIG. 4 is a flowchart of an exemplary method of industrial asset management via the enterprise monitoring system.

FIG. 4 is a flowchart 400 of an exemplary method of industrial asset management via an enterprise monitoring system of an industrial enterprise. At step 402, data characterizing an alarm event report associated with a first industrial machine (e.g., recycle compressor) can be generated by a first user via a first web-based graphical user interface (e.g., web-based GUI 200). The web-based GUI 200 is associated with the enterprise monitoring system 300 (e.g., communicatively coupled to the enterprise monitoring system 300) of the industrial enterprise that includes the first industrial asset. In some implementations, the data storage 306 of the enterprise monitoring system can store event datasets that include information associated with various alarm events in the industrial enterprise. For example, an event dataset associated with the alarm event of the first industrial machine can be stored in the data storage 306.

In some implementations, a monitoring system can detect an alarm event and generate a local event dataset (e.g., stored in local data storage 320/340) that includes various information associated with the alarm. The monitoring system may provide the local event dataset to the enterprise monitoring system 300 that can be stored as event dataset in the data storage 306. In some implementations, the local event dataset may have a large size and it may be inefficient to send the entire local event dataset to the enterprise monitoring system 300. In this case, a portion of the local event dataset can be communicated to the enterprise monitoring system 300. For example, the enterprise monitoring system 300 may request that a portion of the local event dataset is transferred to the data storage 306. Additionally or alternately, a low resolution copy of the local event dataset is communicated to the enterprise monitoring system.

As discussed above, the first industrial machine can be selected from the first portion 202 of the first web-based GUI 200, and an alarm event 214 associated with the first industrial machine (e.g., detection of sub synchronous rub) can be selected from the alarm list 212. Based on the selection of the alarm event 214, the corresponding alarm information can be displayed in the alarm window 222. This can be done, for example, by retrieving the alarm information from the event dataset associated with the selected alarm event (e.g., detection of sub synchronous rub) and stored in the data storage 306.

Figure 5:
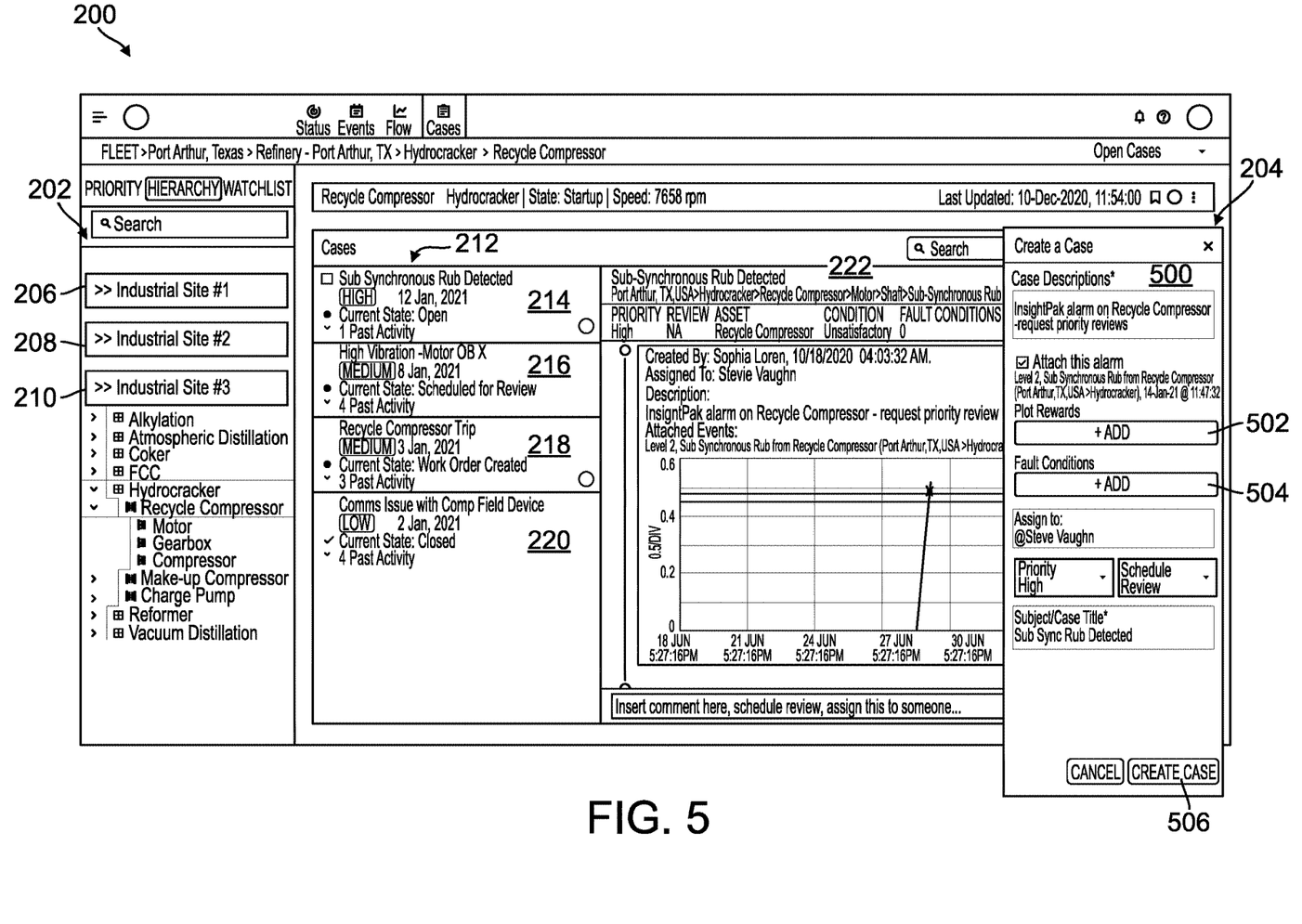
FIG. 5 illustrates the web-based GUI of FIG. 2 that includes a dialog box for generation of an alarm event report.

The first user can generate the alarm event report based on interaction with the interactive graphical object 230. For example, the first user can click on the interactive graphical object 230 that can result in the generation the dialog box 500 in the web-based GUI 200 (as illustrated in FIG. 5). The first user can select the portions of the alarm information (e.g., displayed in the alarm window 222) and request the generation of the alarm event report that includes the selected information. The user can select portions of the alarm information via interaction with interactive graphical object 502, interactive graphical object 504, etc. in the dialog box 500. For example, the user can select the fault conditions 226 via the interactive graphical object 502, the plot 224 in the alarm window 222 via the interactive graphical object 502, etc. In some implementations, certain information associated with the alarm event (e.g., name of the first industrial machine, location of the first industrial machine, etc.) can be automatically added to the alarm event report.

The first user can request generation of the alarm event report (e.g., by interacting the graphical object 506 in the dialog box 500) that includes the selected portions of the alarm information. In other words, the alarm event report includes portions of the event dataset associated with the selected alarm event (e.g., detection of sub synchronous rub). The selected portions of the alarm information can further include location of the first industrial machine, an alarm level associated with the alarm event, operating parameters of the first industrial machine, etc. In some implementations, the alarm event report can be stored in data storage 306. The alarm event report can include the identity of a second user to whom the first user may wish to assign to work on the selected alarm event. For example, the alarm event report can include the contact information (e.g., email address), an identifier assigned to the second user (e.g., by the enterprise monitoring system 300), etc.

Returning back to FIG. 4, at step 404, the alarm event report can be provided to the second web-based graphical user interface (GUI) associated with the enterprise monitoring system (e.g., based on the identity of the second user). For example, the enterprise monitoring system 300 can provide the alarm event report to the second user via a second web-based graphical user 362 in a second user computing device 360. In some implementations, the second web-based GUI can include a portion of the alarm event report (e.g., the portion of the alarm event report to which the second user has been provided access to by the first user).

The alarm event report can include the access (e.g., alarm management rights, database management rights, etc.) provided to the second user. The alarm management rights can allow the second user to access the monitoring system that monitors the alarm event of the first industrial machine, and determine the access level (e.g., actions that can be taken to respond to the alarm event) of the second user. For example, the alarm event can be associated with the first industrial machine 370 that is monitored by the first monitoring system 310. The alarm event report can allow the second user (e.g., associated with the second monitoring system 330) to have access to the first monitoring system and respond to the alarm event. The alarm event report can limit the access of the second user to actions/data in the first monitoring system 310. For example, the second user may have access to the data of a selected industrial machines monitored by the first monitoring system, or the second user can perform an allowed set of operations/actions (e.g., shelve the alarm event, reset the alarm count (e.g., number of times the alarm has occurred), acknowledge the alarm event, etc.).

The database management rights can determine a type of edit that the second user can make to the information associated with alarm event (e.g., changes that the user can make to the alarm event report/event dataset in the data storage 306). For example, the second user may be authorized to access (e.g., read) a first portion of the alarm event report; the second user may be authorized to make changes (e.g., edit, delete, etc.) to a second portion of the alarm report, etc.

The second user can review the alarm event presented on the second web-based GUI 362. The second user may decide to review the alarm event report using a monitoring system. For example, the second user may want to switch from the second web-based GUI 362 to the GUI 332 associated with the monitoring system 330. Switching from the second web-based GUI 362 to the GUI 332 of the monitoring system may be desirable as the latter can provide a larger suite of tools to review and assess the alarm event. For example, the GUI of the monitoring system can include plotting tools, data viewing tools that may not be available in the second web-based GUI. In some implementations, the GUI of the monitoring system may have access to information associated with the alarm event this is not included in the alarm event report. For example, if the industrial machine associated with the alarm event report (e.g., industrial machine 380) is monitored by the monitoring system (e.g., monitoring system 330), it might be desirable to work in the GUI (e.g., GUI 332) associated with the monitoring system as it may allow, the second user to have access to more information associated with the alarm event (e.g., high resolution data) that is not available in the alarm event report.

In order to switch from the second web-based GUI 362 to the GUI of the monitoring system, the second user can request the enterprise monitoring system 300. The monitoring system 300 can receive data characterizing the request to switch from the second web-based GUI 362 to the GUI 332 of the monitoring system 330, and providing the monitoring system 330 access to alarm event report (or at least a portion of the event dataset) in the data storage 306 via the GUI of the monitoring system. In some implementations the GUI 332 of the monitoring system 330 can be displayed on the second user's computing device (e.g., on the display of the second user computing device 360).

Figure 6:
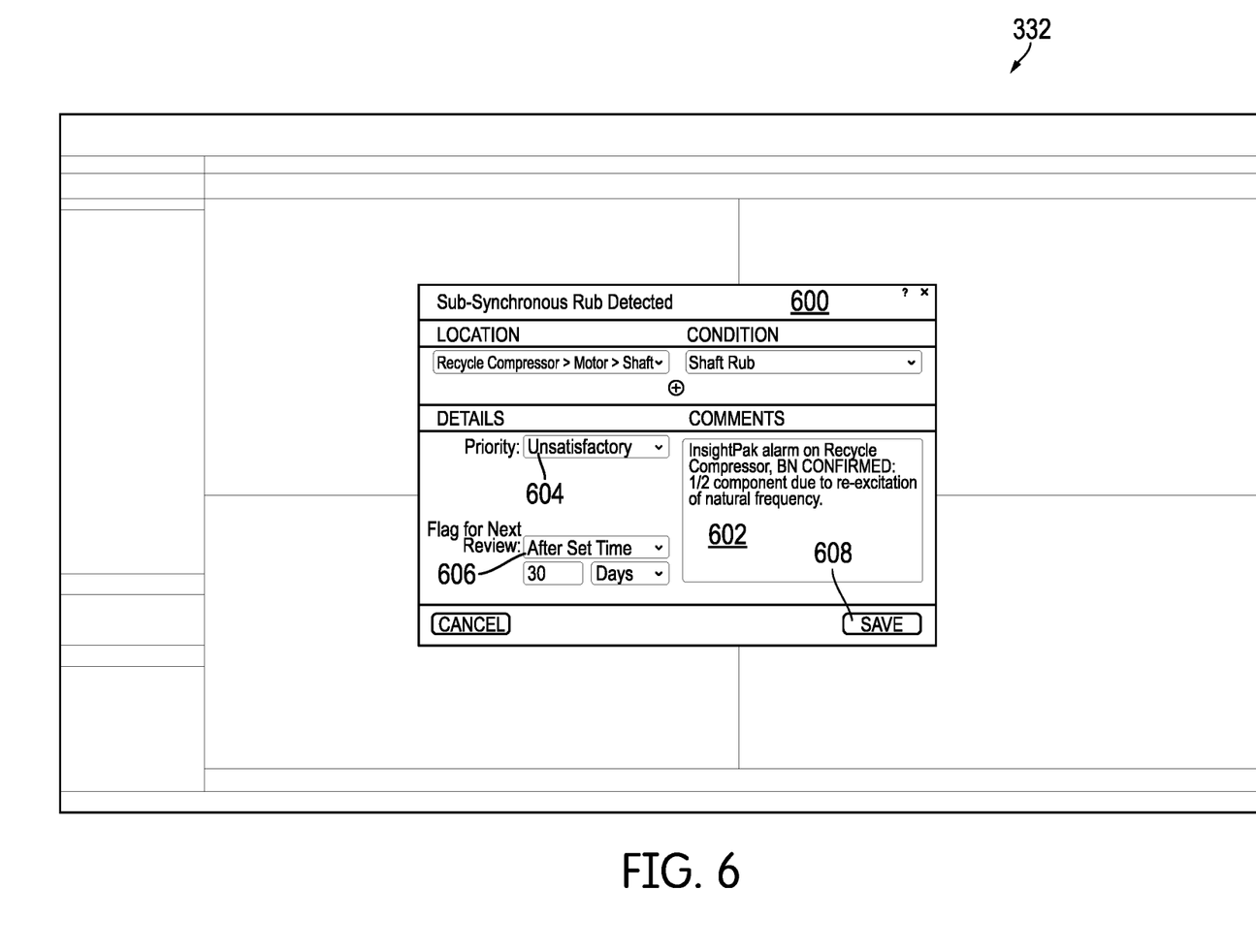
FIG. 6 illustrates an exemplary GUI of a monitoring system in the industrial enterprise.

Returning back to FIG. 4, at step 406, data characterizing additional information associated with the alarm event and/or edits to the event dataset can be received from the second user via GUI of the monitoring system (e.g., GUI 332 of monitoring system 330). In some implementations, the second user can add additional information associated with the alarm event that is generated at the GUI of the monitoring system. For example, GUI 332 of the monitoring system 300 can be used to generate new plot(s) associated with the alarm event (e.g., generated using plotting tools available in the GUI of the monitoring system). FIG. 6 illustrates an example of the GUI 332. The second user can request storing additional information associated with the alarm event via the window 600 in the GUI 332. The window 600 can include a comment portion 602 from which the second user can add new comments (e.g., based on the review of the second user) to the alarm event report (or to a revised alarm event report). The window 600 can include a graphical object 604 via which the second user can change the alarm priority (e.g., high, low, satisfactory, unsatisfactory, etc.). The window 600 can include a second graphical object 606 via which the second user can determine the time line for next review (e.g., when the next review should be performed). After the additional information is prepared via the window 600, the additional information can be saved in the data storage 306 by clicking on the third interactive graphical object 608.

The second user may request that the additional data associated with the alarm event (e.g., operational parameter of the first industrial machine that is available at the monitoring system 330 and not included in the alarm event report/event dataset in the data storage 306) is added to the alarm event report/event dataset in the storage 306. The second user may request changing data values (e.g., fault condition, alarm acknowledgement, etc.) in the alarm event report/event dataset. As discussed above, the ability of the second user to request changes to the alarm event report/event dataset can be based on the access level provided to the second user by the first user. The request from the second user (e.g., including data characterizing additional information associated with the alarm event, edits to the event dataset/alarm event report, etc.) can be received by the enterprise monitoring system 300.

At step 408, data characterizing additional information associated with the alarm event can be stored in data in the data storage 306 or existing event dataset/alarm event report stored in the database 306 can be revised. In some implementations, a revised alarm event report associated with the first industrial machine can be generated and stored in the data storage 306. The revised alarm event report can include the additional information, portions of the previous alarm event report/event dataset. The additional information in the revised alarm event report can be received via the monitoring system GUI (e.g., GUI 332).

In some implementations, the second user may assign a third user for further review of the alarm event. For example, the second user can communicate to the third user (e.g., via the monitoring system GUI 332, the second web-based GUI 362, etc.) and provide the third user with the desirable information needed to perform the review. This can be done, for example, by providing the third user with the revised alarm event report, the previous alarm event report (e.g., generated by the first user). In some implementations, the revised alarm report can include the identity of the third user to whom the second user may wish to assign to work on the selected alarm event. For example, the revised alarm event report can include the contact information (e.g., email address), an identifier assigned to the third user (e.g., by the enterprise monitoring system 300), etc. The enterprise monitoring system can identify and communicate with the third user based on the identity of the third user in the revised alarm event report. As described in steps 406 and 408 of FIG. 4, the third user can provide new information associated with the alarm event that can be stored in the data storage 306 (e.g., as a second revised alarm event report), or can be used to edit the existing revised alarm event report, alarm event report, event dataset, etc.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such w-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
  receiving data characterizing an alarm event report associated with a first industrial machine generated by a first user via a first web-based graphical user interface (GUI), the first web-based GUI associated with an enterprise monitoring system of an industrial enterprise that comprises the first industrial machine,
    wherein the alarm event report comprises at least a portion of an event dataset comprising information of an alarm event associated with the first industrial machine, and an identity of a second user assigned to work on the alarm event report by the first user,
    wherein the event dataset is stored in a database associated with the enterprise monitoring system;
  providing the alarm event report to a second web-based graphical user interface (GUI) associated with the enterprise monitoring system;
  receiving, via a first GUI of a first monitoring system, data characterizing additional information associated with the alarm event or edits to the event dataset;
  storing data characterizing additional information associated with the alarm event in the event dataset in the database or editing the event dataset in the database;
  generating, via the first GUI of the first monitoring system, a revised alarm event report associated with the first industrial machine, the revised alarm event report based at least on the additional information, wherein the revised alarm event report comprises at least the additional information received via the first GUI and an identity of a third user assigned to work on the alarm event report by the second user;

providing the revised alarm event report to a second monitoring system of a second industrial site, wherein in the industrial enterprise comprises the second industrial site;

receiving, via a second GUI of the second monitoring system, data characterizing second additional information associated with the alarm event; and storing data characterizing the second additional information associated with the alarm event in the database.

2. The method of claim 1, further comprising:
receiving data charactering selection of at least a portion of the event dataset to be included in the alarm event report based on interaction of the first user with one or more interactive graphical objects in a dialog box in the first web-based GUI; and generating the alarm event report comprising the portion of the information of the alarm event.

3. The method of claim 2, wherein the information of the alarm event associated with the first industrial machine comprises one or more of location of the first industrial machine, an alarm level associated with the alarm event and operating parameters of the first industrial machine.

4. The method of claim 2, further comprising:
receiving, via the second web-based GUI, data characterizing a request to switch from the second web-based GUI to the first GUI of the first monitoring system; and
providing the first monitoring system access to the at least a portion of the event dataset via the first GUI of the first monitoring system.

5. The method of claim 4, wherein the first monitoring system is configured to monitor the first industrial machine, wherein monitoring comprises:
receiving operating characteristic from sensors operatively coupled to the first industrial machine,
generating an alarm event.

6. The method of claim 1, further comprising:
generating the first web-based GUI comprising a first portion and a second portion, wherein the first portion comprises a list of a plurality of industrial machines in the industrial enterprise;
receiving data characterizing selection of the first industrial machine from the list of the plurality of industrial machines; and
displaying in the second portion of the web-based GUI, information associated with the alarm event of the first industrial machine.

7. The method of claim 6, wherein the second portion of the web-based GUI, comprises a plot of an operating parameter of the first industrial machine as a function of time of detection of the operating parameter.

8. The method of claim 1, wherein the alarm event report further comprises an access level associated with the second user, wherein the access level determines a type of edit to the information associated with alarm event or access to information associated with the first industrial machine stored in the database.

9. The method of claim 1, wherein the data characterizing additional information associated with the alarm event comprises analysis of the alarm event generated via the first GUI of the first monitoring system.

10. A system comprising:
at least one data processor;
memory coupled to the at least one data processor, the memory storing instructions to cause the at least one data processor to perform operations comprising:
receiving data characterizing an alarm event report associated with a first industrial machine generated by a first user via a first web-based graphical user interface (GUI), the first web-based GUI associated with an enterprise monitoring system of an industrial enterprise that comprises the first industrial machine, wherein the alarm event report comprises at least a portion of an event dataset comprising information of an alarm event associated with the first industrial machine, and an identity of a second user assigned to work on the alarm event report by the first user, wherein the event dataset is stored in a database associated with the enterprise monitoring system;
providing the alarm event report to a second web-based graphical user interface (GUI) associated with the enterprise monitoring system;
receiving, via a first GUI of a first monitoring system, data characterizing additional information associated with the alarm event or edits to the event dataset;
storing data characterizing additional information associated with the alarm event in the event dataset in the database or editing the event dataset in the database;
generating, via the first GUI of the first monitoring system, a revised alarm event report associated with the first industrial machine, the revised alarm event report based at least on the additional information, wherein the revised alarm event report comprises at least the additional information received via the first GUI and an identity of a third user assigned to work on the alarm event report by the second user;
providing the revised alarm event report to a second monitoring system of a second industrial site, wherein in the industrial enterprise comprises the second industrial site;
receiving, via a second GUI of the second monitoring system, data characterizing second additional information associated with the alarm event; and
storing data characterizing the second additional information associated with the alarm event in the database.

11. The system of claim 10, wherein the operations further comprise:
receiving data charactering selection of at least a portion of the event dataset to be included in the alarm event report based on interaction of the first user with one or more interactive graphical objects in a dialog box in the first web-based GUI; and
generating the alarm event report comprising the portion of the information of the alarm event.

12. The system of claim 11, wherein the information of the alarm event associated with the first industrial machine comprises one or more of location of the first industrial machine, an alarm level associated with the alarm event and operating parameters of the first industrial machine.

13. The system of claim 11, wherein the operations further comprising:
receiving, via the second web-based GUI, data characterizing a request to switch from the second web-based GUI to the first GUI of the first monitoring system; and
providing the first monitoring system access to the at least a portion of the event dataset via the first GUI of the first monitoring system.

14. The system of claim 13, wherein the first monitoring system is configured to monitor the operations of the first industrial machine, wherein monitoring comprises:
　　receiving operating characteristic from sensors operatively coupled to the first industrial machine, and generating an alarm event.

15. The system of claim 10, wherein the operations further comprise:
　　generating the first web-based GUI comprising a first portion and a second portion, wherein the first portion comprises a list of a plurality of industrial machines in the industrial enterprise;
　　receiving data characterizing selection of the first industrial machine from the list of the plurality of industrial machines; and
　　displaying in the second portion of the web-based GUI, information associated with the alarm event of the first industrial machine.

16. The system of claim 15, wherein the second portion of the web-based GUI, comprises a plot of an operating parameter of the first industrial machine as a function of time of detection of the operating parameter.

17. The system of claim 10, wherein the alarm event report further comprises an access level associated with the second user, wherein the access level determines a type of edit to the information associated with alarm event or access to information associated with the first industrial machine stored in the database.

18. The system of claim 10, wherein the data characterizing additional information associated with the alarm event comprises analysis of the alarm event generated via the first GUI of the first monitoring system.

19. A computer program product comprising a non-transitory machine-readable medium storing instructions that, when executed by at least one programmable processor that comprises at least one physical core and a plurality of logical cores, cause the at least one programmable processor to perform operations comprising:
　　receiving data characterizing an alarm event report associated with a first industrial machine generated by a first user via a first web-based graphical user interface (GUI), the first web-based GUI associated with an enterprise monitoring system of an industrial enterprise that comprises the first industrial machine,
　　　wherein the alarm event report comprises at least a portion of an event dataset comprising information of an alarm event associated with the first industrial machine, and an identity of a second user assigned to work on the alarm event report by the first user,
　　　wherein the event dataset is stored in a database associated with the enterprise monitoring system;
　　providing the alarm event report to a second web-based graphical user interface (GUI) associated with the enterprise monitoring system;
　　receiving, via a first GUI of a first monitoring system, data characterizing additional information associated with the alarm event or edits to the event dataset;
　　storing data characterizing additional information associated with the alarm event in the event dataset in the database or editing the event dataset in the database;
　　generating, via the first GUI of the first monitoring system, a revised alarm event report associated with the first industrial machine, the revised alarm event report based at least on the additional information, wherein the revised alarm event report comprises at least the additional information received via the first GUI and an identity of a third user assigned to work on the alarm event report by the second user;
　　providing the revised alarm event report to a second monitoring system of a second industrial site, wherein in the industrial enterprise comprises the second industrial site;
　　receiving, via a second GUI of the second monitoring system, data characterizing second additional information associated with the alarm event; and
　　storing data characterizing the second additional information associated with the alarm event in the database.

\* \* \* \* \*